US007020256B2

(12) United States Patent
Jain et al.

(10) Patent No.: US 7,020,256 B2
(45) Date of Patent: Mar. 28, 2006

(54) DYNAMIC TELEPHONE NUMBERING SYSTEM

(75) Inventors: Ravi Jain, Mountain View, CA (US); John R. Wullert, II, Martinsville, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 544 days.

(21) Appl. No.: 10/350,855

(22) Filed: Jan. 24, 2003

(65) Prior Publication Data

US 2003/0147519 A1 Aug. 7, 2003

Related U.S. Application Data

(60) Provisional application No. 60/355,463, filed on Feb. 7, 2002.

(51) Int. Cl.
*H04M 1/56* (2006.01)
*H04M 3/42* (2006.01)

(52) U.S. Cl. ........................... 379/201.02; 379/201.11; 379/207.15; 379/211.02

(58) Field of Classification Search ........... 379/201.01, 379/201.02, 201.11, 207.15, 211.02, 221.09
See application file for complete search history.

(56) References Cited

U.S. PATENT DOCUMENTS 6,157,829 A * 12/2000 Grube et al. ............. 455/414.1
6,327,353 B1 * 12/2001 Fukuzawa et al. ..... 379/201.01
2004/0101123 A1 * 5/2004 Garcia .................. 379/220.01

* cited by examiner

*Primary Examiner*—Harry S. Hong
(74) *Attorney, Agent, or Firm*—Joseph Giordano; James W. Falk

(57) ABSTRACT

The present invention relates generally to logical telephone numbers. In particular, dynamic number users are able to obtain dynamic numbers and to map those numbers to routable numbers of their choosing. The present invention provides a tool for protecting privacy while sharing and/or publicizing a number for public purposes. The present invention relates to a Dynamic Telephone Number Service (DTNS.) wherein users are provided with a logical temporary telephone number that is mapped dynamically to a physically addressable number. The use of the DTNS allows a dynamic number user to publish the logical number, thus avoiding the need to publish private information and phone numbers for public purposes. Further, the logical number is not permanently assigned, but rather is temporary and provided to the dynamic number user for a relatively short period of time.

2 Claims, 5 Drawing Sheets

DYNAMIC TELEPHONE NUMBERING SYSTEM

CROSS-REFERENCE TO RELATED APPLICATION

This application is a non-provisional application of provisional application Ser. No. 60/355,463 filed Feb. 7, 2002.

FIELD OF THE INVENTION

The present invention relates generally to logical telephone numbers. In particular, dynamic number users are able to obtain dynamic numbers and to map those numbers to routable numbers of their choosing. The present invention provides a tool for protecting privacy while sharing and/or publicizing a number for public purposes.

BACKGROUND OF THE INVENTION

People wishing to be contacted by telephone must reveal their telephone numbers and for most situations, this does not represent a problem; e.g. revealing phone numbers to friends and family. However, situations do exist where people wish to be contacted by telephone without revealing their assigned (home or cellular) telephone number. For example, a person placing a classified ad to sell an automobile needs to publish a number that potential buyers can call, but the seller does not want to continue to receive calls after the car is sold.

Within the current fixed and cellular telephone networks, telephone numbers are generally associated with a specific access line or specific terminals. For example, a residential phone number is tied to a specific access line and a cellular phone number is tied to a specific handset. In the fixed telephone network, the linkage between the telephone number and the access line is nearly permanent.

This physical, semi-permanent mapping of telephone numbers to access lines or terminals can be a disadvantage in many situations, including that noted above of a person who places a classified advertisement to sell a car. In particular, the person placing the ad has no way to prevent people from calling after the car has been sold. In addition, the proliferation of computerized telephone directories allows people to determine the geographic address associated with the telephone number, and therefore publication of a standard telephone number reveals a substantial amount of information which the person placing the ad may not want to reveal. While in cellular telephone networks, the association between a telephone number and the handset can be altered, this transition typically entails a time-consuming process, e.g. the customer calls the service provider and transfers service to a new handset.

This is an even greater problem for people trying to use private or semi-private facilities for public purposes. Obviously, people with private numbers do not want to reveal such number in a public forum, such as a classified advertisement. In addition, customer service centers have a related problem. Customer service centers often accept inquiries via e-mail or voice mail, and then make return calls to the customers. If the customer cannot be reached directly, the representative may leave a telephone number for the customer to call back. However, once this number is given to the customer, there is no way to prevent the customer from making direct calls to that number for subsequent requests or unrelated activity.

In another similar situation, doctors who return calls to patients generally will not leave their private numbers in cases where they do not connect, in order to avoid having patients contact them directly. This scenario can be further complicated by the use of certain AIN features. For example, to protect privacy, the doctor may have Caller-ID Block, and to screen incoming calls the patient may have Anonymous Call Reject. This combination will effectively prevent the doctor and patient from communicating.

The semi-permanent linkage of phone number to location is not the case for certain classes of numbers. In particular, toll free numbers such as 800 and 888 numbers are logical numbers that are matched dynamically to addressable numbers in a database within the telephone network. These toll free numbers have other properties that limit their usefulness in certain situations. In particular, these numbers also involve an alternate billing model where the called party pays, and a person placing a classified ad will not generally want to pay for all the calls that come in response. Further, these number have no geographic significance whatsoever and therefore, callers responding to an ad can not use the locational information in the number (area code and exchange) to get an idea of how far they might need to travel to see the item for sale, (for example, to see and test drive a car). Toll-free numbers are not appropriate in these situations.

Therefore, there remains a need in the art for improvements in the field of dynamic telephone numbers.

BRIEF DESCRIPTION OF THE INVENTION

The present invention relates to a service that can issue temporary logical telephone numbers, referred to herein as a Dynamic Telephone Number Service (DTNS.) The DTNS provides dynamic number users with a logical temporary telephone number that is mapped dynamically to a physically addressable number. By using the DTNS, the disadvantages noted above can be avoided. In particular, the use of the DTNS, allows a dynamic number user to publish the logical number, thus avoiding the need to publish private information and phone numbers for public purposes. Further, the logical number is not permanently assigned, but rather is temporary and provided to the dynamic number user for a relatively short period of time.

DETAILED DESCRIPTION OF THE INVENTION

Figure 1:
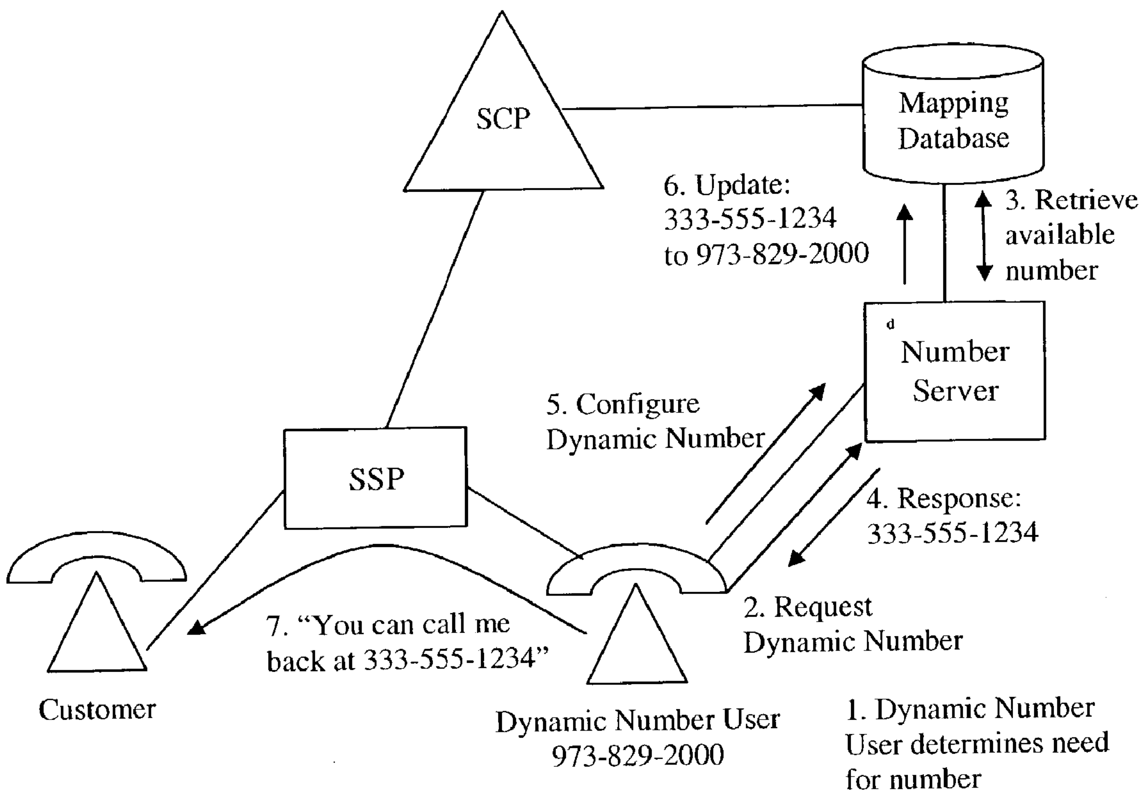
FIG. 1 is a block diagram showing an architecture and process flow for requesting and configuring a dynamic telephone number in accordance with one embodiment of the present invention.

The present invention will be described in detail below with reference to the drawing figures. The public switched telephone network includes all the basic elements necessary to provide DTNS, but those elements are currently used for other purposes. In particular, a Service Control Point (SCP), as an adjunct to a Service Switching Point (SSP) allows for the dynamic mapping of logical numbers to routable numbers. This functionality is used for toll-free calling. In addition, a similar configuration is used to implement local number portability, where a user originally served by one SSP moves to a location served by a second SSP but wishes to retain the same telephone number. In this case, calls to the number are routed to the original SSP, which performs a database lookup and redirects the call to the new, hidden number, at the new SSP.

FIG. 1 shows an architecture and process flow for requesting and configuring a dynamic telephone number in accordance with one embodiment of the present invention. The architecture consists of some Service Switching Points (SSP) (for convenience, only one is illustrated); connected to the telephone users, i.e. both the dynamic number user who requests the temporary number and a customer who dials the temporary number; and to a Service Control Point (SCP). The SCP has access to a mapping database that maps logical to routable numbers. The dynamic number user accesses the mapping database through a number server. The interface between the dynamic number user and the number server may be implemented in many ways, including a voice interface, voice interface utilizing speech recognition; a computer interface such as a web page; or through communication with a service representative. In addition, a customer calling the dynamic number may interface with the system in many ways including voice interface, voice interface utilizing speech recognition, computer interface, web page interface, or communication with a service representative. The request and configuration process goes as follows:

Step 1: The need for a dynamic telephone number arises. This may be for one of the reasons noted above or below, or for any other reason where the dynamic number user does not wish to reveal his standard telephone number.

Step 2: The dynamic number user submits a request to the number server for a dynamic number.

Step 3: The number server queries the mapping database to retrieve an unassigned number.

Step 4: The number server returns the dynamic number to the dynamic number user.

Step 5: The dynamic number user configures the dynamic number. For example, as shown in FIG. 1, the dynamic number user submits the corresponding routable number to which the dynamic number should be mapped. In addition, the dynamic number user may configure other parameters associated with the dynamic number, such as the lifetime of the dynamic number (which may be specified in terms of time, maximum number of calls, maximum number of distinct callers, maximum cost for using the service, or other suitable metric), the phone numbers of the parties allowed to call the dynamic number or alternate instructions if the routable number is busy. The DTNS provider can provide other configuration parameters useful to dynamic number users.

Step 6: The configuration for the dynamic number is stored in the SCP.

Step 7: The dynamic number user provides the dynamic number to the customer, including pertinent instructions, such as, a PIN; the time period for which the dynamic number is valid, etc. The dynamic number may be provided to the customer via email, voice call with Caller-ID Block, or any other means that does not reveal the user's standard number.

Some parts of the flow noted above can be collapsed. For example, the dynamic number user may have a default configuration set up. Thus in step 2, when the dynamic number user requests the dynamic number, the dynamic number user's identity may be conveyed to the number server (e.g., as the dynamic number user's Caller ID, or via an Interactive Voice Response (IVR) interaction with the number server, via the Web, or some other method). The number server then performs a default configuration, mapping the dynamic number to the dynamic number user's usual telephone number and sets the parameters in accordance with the default configuration, such as a fixed duration.

Figure 2:
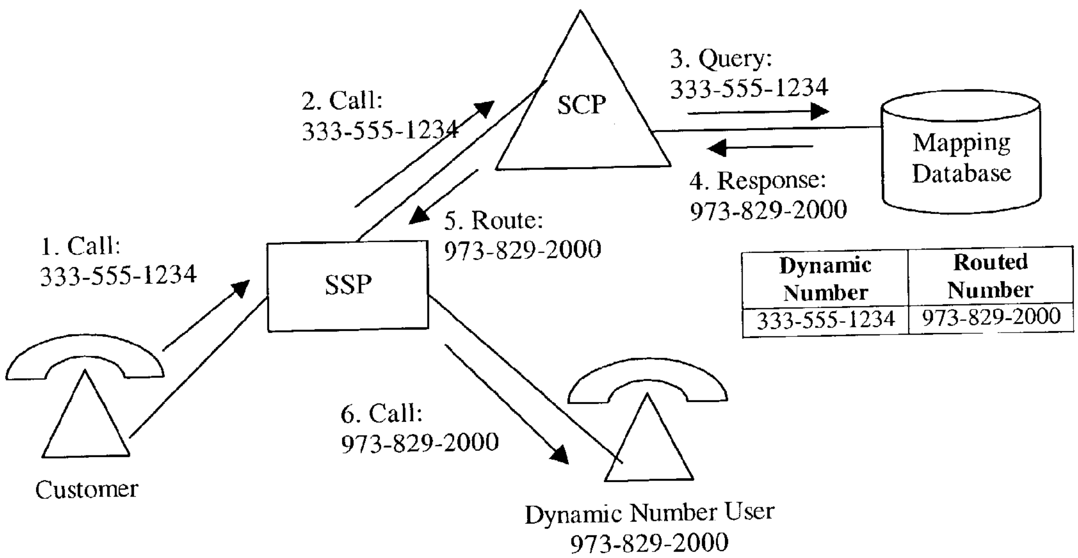
FIG. 2 is a block diagram showing a process flow to complete a call to a dynamic telephone number in accordance with another embodiment of the present invention.

FIG. 2 is a block diagram showing a process flow to complete a call to a dynamic telephone number in accordance with another embodiment of the present invention, wherein the process has the following steps:

Step 1: Customer dials the dynamic number, which is delivered to the SSP.

Step 2: The SSP queries the SCP for instructions on how to route the incoming dynamic number.

Step 3: The SCP queries the mapping database to determine the proper mapping for the dynamic number.

Step 4: The mapping database returns the mapping currently in effect and any other pertinent information (such as valid calling numbers).

Step 5: The SCP instructs the SSP on how to route the call.

Step 6: The SSP delivers the call to the proper destination.

In the basic operation described above, the dynamic number user's actual standard phone number is hidden from the customer by using Caller ID Block or because the dynamic number user utilizes some other communication method like email. However, it would be desirable that the dynamic number user be able to make a simple phone call to deliver the dynamic number to the customer, and have the dynamic number user's Caller ID be the dynamic number. One method of accomplishing this in accordance with the present invention is to modify the Automatic Number Identification (ANI) field in the Initial Address Message (IAM) generated by the SSP when the dynamic number user initiates the service. Instead of the ANI being the dynamic number user's standard number, the ANI is set to the dynamic number. The process flow can be as follows:

Step 1: The dynamic number user dials the customer's number.

Step 2: A trigger is fired at the dynamic number user's originating SSP (e.g. Originating_Call_Attempt).

Step 3: The trigger results in a DTNS Call Processing Record (CPR) containing service logic being invoked at the SCP. The CPR compares the customer's number and the dynamic number user's standard number and concludes that the dynamic number user has dynamic numbering for this customer. The CPR may also check that the lifetime of the dynamic number is still valid, in accordance with one or more of the metrics described above. The SCP then returns the dynamic number to the originating SSP.

Step 4: The originating SSP generates the usual initial address message (IAM) to initiate the call, however, instead of inserting the dynamic number user's ANI in the IAM message, the SSP inserts the dynamic number.

Other triggers could be used as alternatives to make this approach work. One problem with this approach is that the ANI may be used for other functions in the network and therefore changing the ANI to the dynamic number may create call-processing errors. In addition, an ANI that does not correspond to a number that is under the control of the originating SSP may be blocked for security reasons.

To address these issues, the switching network can validate a user's identity and only insert authorized dynamic numbers into the ANI field. This validation can be on a per-call basis, rather than tied to a particular telephone, as illustrated in FIG. 2, in order to ensure that only authorized users take advantage of the feature. This approach is illustrated in FIG. 3.

Figure 3:
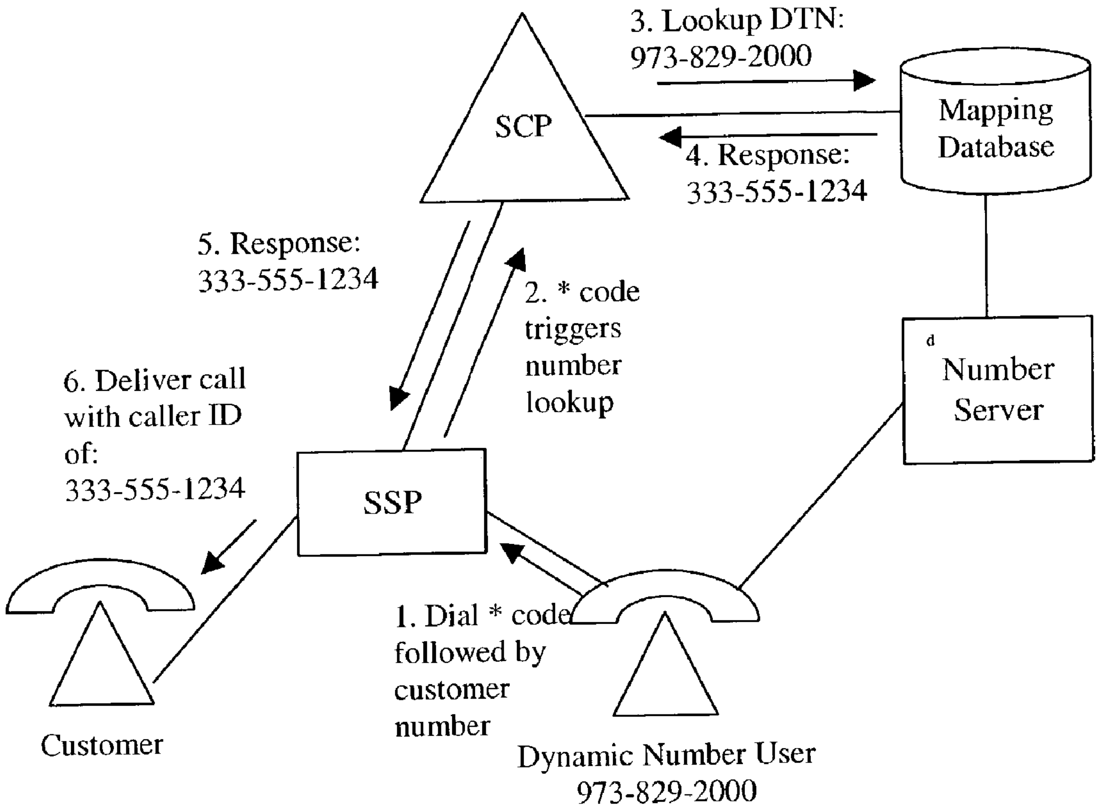
FIG. 3 is a block diagram showing a process flow for using a dynamic telephone number as a caller ID value for outgoing calls in accordance with another embodiment of the present invention.

FIG. 3 is a block diagram showing a process flow for using a dynamic telephone number as a caller ID value for outgoing calls in accordance with another embodiment of the present invention and comprises the following steps:

Step 1: The dynamic number user dials a star code followed by the telephone number of the customer, which is delivered to the SSP.

Step 2: The SSP queries the SCP for the dynamic number associated with the dynamic number user. FIG. 3 shows this query being based on the dynamic number user's calling number, but the dynamic number user could alternatively be asked to enter a code and PIN, or use some other identifier.

Step 3: The SCP queries the mapping database to determine the proper mapping for the dynamic number.

Step 4: The mapping database returns the mapping currently in effect and any other pertinent information (such as valid calling numbers).

Step 5: The SCP instructs the SSP on the caller ID value to be used for the call.

Step 6: The SSP delivers the call to the proper destination using the dynamic number as the caller ID information.

In an alternative approach, the ANI is left as-is in the signaling messages sent by the originating SSP, but an additional field, e.g. ReplyTo, is added and set to the dynamic number. In this alternative the customer would see the ReplyTo field instead of the ANI as the Caller ID. This approach would require modification not only to the signaling protocol but the signaling network elements, switches and terminal devices (e.g. Caller ID devices) that display the Caller ID. While such changes are unlikely within the SS7 protocols currently in use, due to the large expense required to update thousands of switching elements, this capability could be included in emerging session protocols such as the Session Initiation Protocol (SIP).

Figure 4:
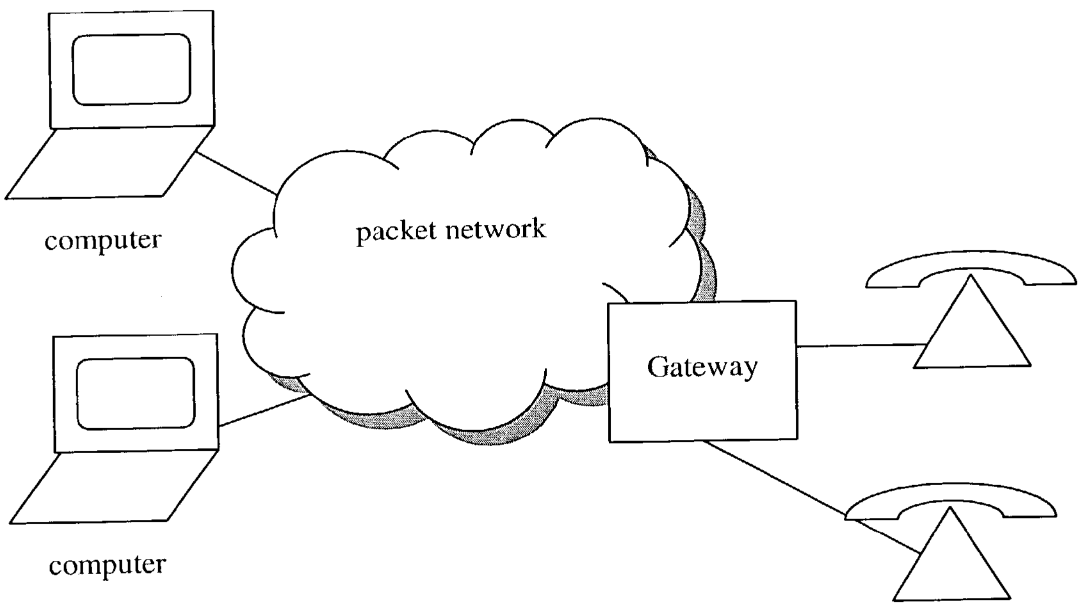
FIG. 4 is a block diagram showing a general NGN environment in accordance with the present invention.

The present invention is also applicable to Next Generation Network (NGN) architectures. In next generation networks, as shown in FIG. 4, telephone calls, telephone signaling and computer data share a single network. The terminals used for telephone calls are no longer limited to basic handsets, but computers can also serve as telephones. Personal computers can connect directly to the packet network that connects terminals in next generation networks, while standard telephones connect to the packet network through a gateway. The fact that telephony signaling can end at the customer equipment (the computer) in certain cases is important to the implementation of a dynamic number service.

For NGN, three different scenarios may be considered; 1) customer has a PC and is calling the dynamic number user who has a phone (PC-to-phone); 2) customer has a phone and is calling the dynamic number user who has a PC (PC-to-phone); and 3) customer has a PC and is calling the dynamic number user who has a PC (PC-to-PC).

Scenario 1) PC-to-Phone.

For PC-to-phone situation, the step of the dynamic number user obtaining the dynamic number and informing the customer of the dynamic number (using Caller ID block or email), is the same as described above with respect to FIG. 1. When the customer dials the dynamic number user's dynamic number, the translation to the standard number could be done in the SCP as described above, or in a $3^{rd}$-party application (translation) server, or the Gateway as part of the NGN architecture. It is also possible for the translation to be done at the customer's terminal if it is suitably equipped. Translation on the curtomer's terminal, or any equipment outside the control of the network operator, may be undesirable because of the risk that unscrupulous individuals could extract the dynamic number user's true number.

Figure 5:
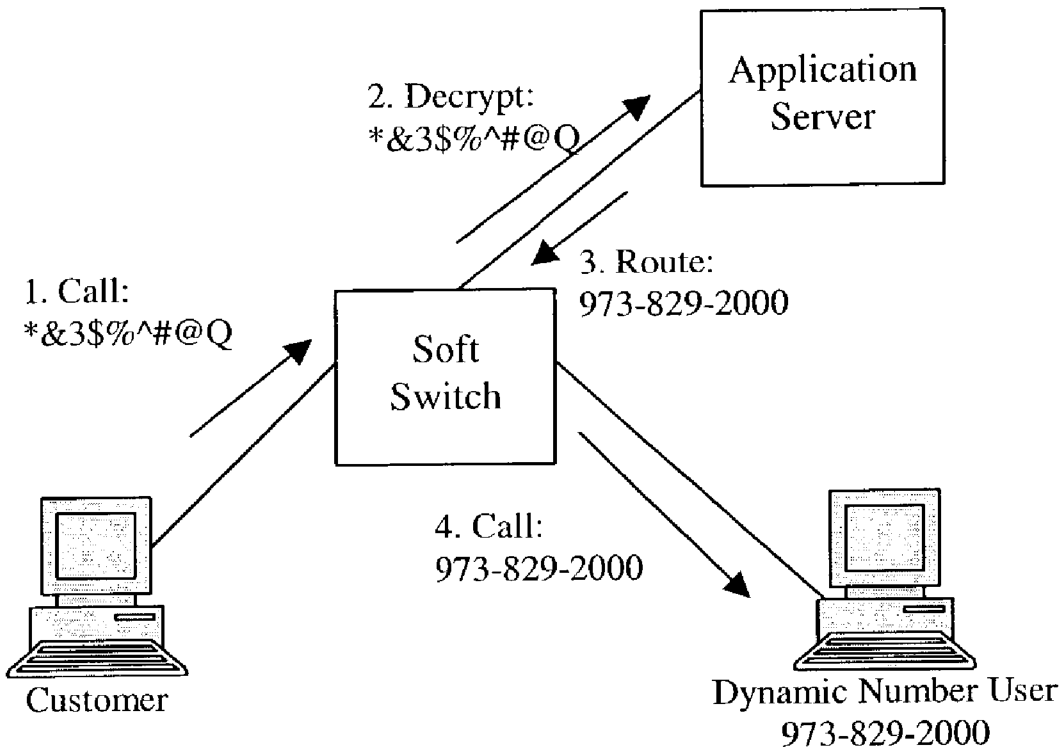
FIG. 5 is a block diagram showing a process flow wherein the DNTS is implemented in an NGN environment and contact is carried out from one PC to another PC, in accordance with one embodiment of the present invention.

In an NGN environment where customers are making calls through a PC, it is possible that customers would not have to "dial" numbers, but would access communications through an electronic interface, such as clicking on a Web link. FIG. 5 is a block diagram showing a process flow wherein the DTNS is implemented in an NGN environment and contact is carried out from one PC to another PC, in accordance with one embodiment of the present invention. In this embodiment, an encryption operation is utilized. In particular, the dynamic number contained within the link is an encrypted version of the actual routed number. The link would also contain instructions on how to decrypt the number. As shown in FIG. 5, when the customer clicks the link, the encrypted number is sent to the softswitch. The softswitch, based on the instructions it received with the encrypted number, delivers it to a third-party application server. The application server decrypts the number and responds with a routable number, which the softswitch uses to connect the call. This embodiment depends on the customer gaining access through a PC, because it would not be possible to dial most encrypted numbers, but the destination could be either a PC or a telephone.

Scenario 2) Phone-to-PC.

For Phone-to-PC the step of the dynamic number user obtaining the dynamic number can be accomplished in a number of ways. For example, the dynamic number user could request and configure the dynamic number electronically, through a web interface. Alternatively, the interface the dynamic number user employs to place outgoing calls might provide dynamic numbering as an option, e.g. the dynamic number user simply clicks a box before placing the call. When the customer dials this number, the mapping to a routable number can take place, as above, with an SCP, an application server, or in the residential gateway.

The table below shows a comparison for implementing dynamic number mapping within an NGN environment. In particular, the table compares the mapping function as carried out by an SCP, an application server, or by the residential gateway.

| | SCP | Application Server | Residential Gateway |
|---|---|---|---|
| Flexibility and control | Medium: The DTNS provider may not own the SCP but typically would have a business relationship with the SCP owner (e.g. network operator). | High - The DTNS provider is in complete control of the mapping process and can implement it in any way they see fit. | Low - gateways must be pre-configured and reprogramming them is a major undertaking. Further, the DTNS provider may have little or no influence on how the gateway is configured. |

-continued

| | SCP | Application Server | Residential Gateway |
|---|---|---|---|
| Security | High - the mapping process is confined to the network service provider, so the routable number is as secure as the network allows. | High - the DTNS provider has the ability to control and limit access to the mapping database. | Low - mapping information must be sent over the network and thus is more susceptible to discovery. |

Scenario 3) PC-to-PC.

The PC to PC scenario is simply a combination of scenarios 1) and 2) described above. Specifically, the dynamic number user has the power of the PC, which could be used as an interface for configuring the dynamic number as well as a terminal for receiving calls. The caller also has a PC, so clicking a link, selecting from a menu or dialing on a pad on the screen could all be used to initiate calls. In addition, the number translation could occur in a network element such as an SCP or in the caller's or dynamic number user's PC. However, as noted above, translation on the curtomer's terminal, or any equipment outside the control of the network operator, may be undesirable because of the risk that unscrupulous individuals could extract the dynamic number user's true number.

As noted above, it is important that the dynamic number user's actual standard phone number be hidden from the customer by using Caller ID Block or because the dynamic number user utilizes some other communication method like email. The hiding of the standard phone number can be accomplished in an NGN architecture also as will be explained below with respect to each of the three scenarios noted above.

Scenario 1) PC-to-Phone.

Hiding the standard phone number is similar in the NGN environment to the PSTN environment for this scenario; i.e. by using Caller ID Block or by utilizing alternate communication methods. In addition, the hiding could be done at the customer's residential gateway, but this alternative raises a security concern since the gateway is not in the control of the DTNS provider.

Scenario 2) Phone-to-PC.

Hiding can be accomplished by modifying the call setup messages in the underlying protocol e.g. the SIP Invite message.

Scenario 3) PC-to-PC.

Hiding can be accomplished in this scenario by either one of the two scenarios above.

As noted above, a key feature of DTNS is that the dynamic number user can hide his standard phone number by substituting the dynamic number in the caller ID field. This is often referred to as "spoofing" the caller ID field. In addition, Caller ID spoofing can be very useful for other purposes, for example, to indicate a different number to call back on, e.g. "call me back on my cell phone". However, there are also potential security issues with Caller ID spoofing. For example, a prankster can pretend to be the called party's mother so that the called party will pick up the phone, or a malicious user can make a denial-of-service attack where ten thousand numbers are called and caller ID is spoofed to the target's phone number. If even a small percentage of the people called; e.g. 10%, call back the spoofed number, it can create sever problems for the target. Therefore, the DTNS service should enable "safe spoofing"; i.e. the dynamic number user can only substitute his number with a number he obtained from DTNS and not an arbitrary number.

The manner in which safe spoofing is enforced depends on where the dynamic number mapping is performed. If a network element such as an SCP inserts the dynamic number for the actual callers number in the caller ID field of a call set up message, the network element can be programmed to perform only authorized substitutions. The user has no direct control of the network element and therefore cannot create arbitrary spoofs. If the user terminal generates the call set up message, and therefore makes the substitution of caller ID values, then a network element could analyze all outgoing messages to determine if the substitution is a valid one. This network element would need to see a valid original number (which might also be used for billing) and would ensure that the inserted number is one the caller is authorized to use. If the valid original number were included in the set up message, the network element would strip it before forwarding the message. Alternatively, the valid original number could be communicated in a separate message. Two responses are possible when the network element identifies an unauthorized usage of a dynamic number as a caller ID. One option is to block the call. The second alternative is to allow the call to proceed, but to insert an indication of the lack of valid caller ID into the set up message. This indication can be used to alert the called party that the information has not been validated.

The DTNS according to the present invention can provide other advantages. For example, the use of dynamic numbers can avoid the need for PINs, so that the customer does not have to go through a two-level dialing sequence to complete the connection (for example, in the customer service center scenario described above). In addition to the convenience of reducing the dialing necessary to complete the connection, avoiding the need for PINs can be advantageous when combined with certain AIN or other advanced telephony features. For example, a "return call" feature which allows a subscriber to complete a call to the number of the most recent incoming call, without having to know that number by pressing a special code, such as *69, will not work if the last caller did not have a directly dialable number, e.g. the last caller is connected to the PSTN via a PBX, or would like the subscriber to call back to a conference bridge requiring a PIN, or any other situation where a two-level dialing sequence is required to reach the last caller. This disadvantage of the return call feature can be overcome if the last caller has a dynamic number and can enter it in place of his caller ID field.

If the caller can insert a valid alternate number in the caller ID field, as described above, then the automated call return can use that number when placing the return call. Thus the return call could terminate someplace other than the terminal that placed the call. This is one reason for the spoofing protections described above.

Similarly, "call back on busy" service which allows a subscriber to "camp on" to a busy number in general operates in the following fashion. On finding a busy line the subscriber dials a special code, such as *5, and hangs up; then the PSTN switch calls the subscriber as soon as the busy line becomes free and completes the call. This service will not work in the case of trying to reach a conference bridge where the conference bridge number is not busy but the conference itself is full, e.g. has run out of ports, or in any situation where a two-level dialing sequence is required and it is not the first level of the sequence that is busy. Once again this disadvantage can be overcome if the called party had a dynamic number. A dynamic number that was mapped directly to a specific conference on the bridge could be called multiple times until a port was available.

In general, any service or feature where a two-level dialing sequence is needed to complete a connection, can have the problems noted above. The use of dynamic numbers as provided by the DTNS of the present invention can avoid these problems.

The general concept of dynamically mapping logical addresses to physical addresses as presented in connection with the DTNS of the present invention, could equally be applied to domains other than telephony. For example, customer service representatives and others frequently communicate using e-mail. The problems associated with the ability to directly respond to the e-mail mirrors those problems noted above with respect to telephony. In particular, customers may use email addresses learned in one interaction to contact individual representatives directly for subsequent problems or unrelated issues. Therefore, the use of a dynamic value as a temporary email address e.g. 1234567890@somecallcenter.com, where the sequence “1234567890” is a dynamic number can provide the same advantages as noted above with respect to DTNS in telephony. An even greater advantage can be achieved by using a phone number as the dynamic number, in that the dynamic number can serve double duty both as a phone number that can be dialed by the customer or an e-mail address that can be input by the customer.

EXAMPLES

Example 1

A dynamic number user wishing to sell a car contacts the DTNS provider to request a dynamic number, specifying any pertinent parameters to be associated with the dynamic number, such as an expected duration of use. The DTNS provider requests a physically routable number from the dynamic number user, to which the dynamic number will be linked. The DTNS provider gives the dynamic number user a dynamic number and then creates a link between the dynamic number and the routable number in a database. The dynamic number user then places the classified ad, using the dynamic number as the number for potential buyers to call. When a potential buyer calls the dynamic number, the call is routed to the service provider. The service provider uses the incoming dynamic number to query the database to determine where to route the buyer’s call and then directs the call to that number. After the car is sold, the dynamic number can be treated in several ways. One option is to remove the database entry and take the dynamic number out of service. After some suitable delay, the DTNS provider could put the dynamic number back into the pool to be used again. Alternatively, database entry would be updated to route incoming calls to a voice message announcing that the car had been sold. This option is beneficial both to the potential buyers, who would know not to bother making repeated call attempts and to the service provider, by reducing the number of repeat calls and thus the load on the service provider’s facilities. In addition, the DTNS service provider could augment the message with an advertisement, indicating that it had provided the dynamic number service. In a further option, if the DTNS service provider was associated with the offering of the classified advertisements, the number might be re-directed to an announcement about a similar car for sale or to a different seller if the cars were nearly identical.

Example 2

A Customer Service Representative (CSR) receives a message from a customer seeking service. Before returning the call to the customer, the CSR places a request for a dynamic number. In this case, DTNS might be provided by the company’s call-center system or a private branch exchange. The CSR leaves this number for the customer to use to call back regarding the service. The CSR may also configure the dynamic number, with such parameters as time duration, a PIN, the customer’s telephone or identification number or other specific instructions. The customer calls the dynamic number, and the routing system queries the database to retrieve the configuration information, after which several options are available. The call could be connected directly to the particular CSR or to a queue waiting for that CSR and the CSR can then interact directly with the customer. Alternatively, the call can be routed to the next available CSR. In the event that the dynamic number is configured with the customer telephone or identification number, then the routing system compares the telephone number of the caller, as reported by the caller ID, with that entered in the configuration. If the two numbers match, then the call is routed as above, but if the numbers do not match, the call could be routed to an appropriate voice announcement.

While many call centers assign a case number or order number to callers and may provide the customer with the PIN for phone inquiries, such practice requires the caller to remember information in addition to the telephone number. By using the dynamic number provided by the DTNS of the present invention, the need for more than one number is obviated.

In conjunction with routing the telephone call to the correct CSR, the routing system can perform other value-added services. For example, the system could use the information returned from the database query to determine the customer’s identity and can automatically provide the CSR with customer information, such as sales histories, previous service requests, etc. The system may also route the customer to a pre-recorded voice message describing a solution to the customer’s problem, or a particular response can be selected by the CSR during configuration of the dynamic number. The customer can listen to the pre-recorded message and if satisfied simply hang up, or may elect to talk to the CSR after listening to the message.

When responding to the customer with the dynamic number, the CSR may inform the customer that the dynamic number is valid only for a limited time, e.g. twenty-four hours. After the dynamic number expires, it may be taken out of service, at which time, calls to the dynamic number may be routed to a central customer inquiry number.

Example 3

The example described in Example 2 may be similarly deployed by a doctor. In this example, the doctor would request a dynamic number prior to calling a patient. Configuration of the dynamic number could be carried out automatically based on previously provided information or set to default information. For example, the routable number could be preset to the doctor’s cellular telephone number, duration for the dynamic number could be set to a default value, and an indication for valid incoming number, i.e. the patient's number, could be populated with the number the doctor dials after requesting the dynamic number. The DTNS provider can perform the call routing so that a patient's Caller ID displays the dynamic number rather than the doctor's actual number, thus allowing both the doctor and the patient to enjoy AIN features while still maintaining privacy.

Example 4

A dynamic number user wishing to set up a conference bridge requests a dynamic number be assigned temporarily for a conference call. The use of the dynamic number avoids the need for two-level dialing involving PINs.

It is anticipated that other embodiments and variations of the present invention will become readily apparent to the skilled artisan in the light of the foregoing description and examples. For example, the present invention is primarily described above with respect to two-party voice telephone calls, but has equal applicability to conference calls, video calls, multimedia sessions, text chat sessions and other similar communications sessions. All such embodiments and variations are intended to be included within the scope of the invention as set out in the appended claims.

What is claimed is:

1. A system for assigning dynamic telephone numbers on a temporary basis and routing calls made to said dynamic telephone numbers, said system comprising:

means for a requestor to request a dynamic telephone number;

means for assigning said dynamic telephone number to said requestor;

means for mapping said dynamic telephone number to a standard telephone number;

means for routing calls made to said dynamic telephone number from said dynamic telephone number to said standard telephone number; and wherein said dynamic telephone number is made available to said caller via caller ID, and wherein said dynamic telephone number is substituted for said standard telephone number in the Automatic Number Identification field and the standard telephone number is thus hidden from said caller.

2. A system for assigning dynamic telephone numbers on a temporary basis and routing calls made to said dynamic telephone numbers, said system comprising:

means for a requestor to request a dynamic telephone number;

means for assigning said dynamic telephone number to said requestor;

means for mapping said dynamic telephone number to a standard telephone number;

means for routing calls made to said dynamic telephone number from said dynamic telephone number to said standard telephone number; and wherein said dynamic telephone number is made available to said caller via caller ID, and wherein said caller ID displays a Reply To field set to said dynamic telephone number and the standard telephone number is thus hidden from said caller.

* * * * *